United States Patent
Chun et al.

(10) Patent No.: US 8,391,127 B2
(45) Date of Patent: Mar. 5, 2013

(54) METHOD AND APPARATUS FOR TRANSMITTING UPLINK CONTROL SIGNAL IN RELAY STATION

(75) Inventors: Jin Young Chun, Gyeongki-do (KR); Han Gyu Cho, Gyeongki-do (KR); Dong Guk Lim, Gyeongki-do (KR); Bin Chul Ihm, Gyeongki-do (KR); Jin Sam Kwak, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/882,556

(22) Filed: Sep. 15, 2010

(65) Prior Publication Data

US 2011/0064019 A1 Mar. 17, 2011

Related U.S. Application Data

(60) Provisional application No. 61/242,803, filed on Sep. 16, 2009, provisional application No. 61/245,131, filed on Sep. 23, 2009.

(30) Foreign Application Priority Data

Apr. 5, 2010 (KR) .................. 10-2010-0030930

(51) Int. Cl.
*H04J 11/00* (2006.01)
(52) U.S. Cl. ....................................... 370/203
(58) Field of Classification Search .............. 370/203, 370/208
See application file for complete search history.

(56) References Cited

U.S. PATENT DOCUMENTS

| | | | |
|---|---|---|---|
| 2008/0056173 A1* | 3/2008 | Watanabe | 370/315 |
| 2008/0130483 A1* | 6/2008 | Khandekar et al. | 370/208 |
| 2008/0159217 A1* | 7/2008 | Chang et al. | 370/329 |
| 2008/0165881 A1* | 7/2008 | Tao et al. | 375/267 |
| 2008/0225789 A1* | 9/2008 | Kim et al. | 370/329 |
| 2010/0124184 A1* | 5/2010 | Dayal et al. | 370/280 |
| 2011/0058522 A1* | 3/2011 | Xu et al. | 370/329 |

OTHER PUBLICATIONS

Shkumbin, H., IEEE 802.16 Broadband Wireless Access Working Group, "The Draft IEEE 802.16m System Description Document," Jun. 16, 2008, pp. 1-55.
Sydir, J., et al., IEEE Communications Magazine, "An Evolved Cellular System Architecture Incorporating Relay Stations," Jun. 2009, pp. 115-121.
Peters, S., et al., IEEE Communications Magazine, "The Future of WiMAX: Multihop Relayng with IEEE 802.16j," Jan. 2009, pp. 104-111.

* cited by examiner

*Primary Examiner* — Mark Rinehart
*Assistant Examiner* — Peter Cheng
(74) *Attorney, Agent, or Firm* — Morgan, Lewis & Bockius LLP

(57) ABSTRACT

A method of transmitting an uplink (UL) control signal of a relay station is provided. The method includes: configuring a UL relay zone for transmitting a signal by the relay station to a base station in a frame; configuring a resource unit including a plurality of symbols and a plurality of subcarriers to allocate the UL control signal in a subframe of the UL relay zone; and transmitting the UL control signal by using the resource unit, wherein, if a transition gap required for switching of signal transmission and reception of the relay station is included in the subframe, the UL control signal is transmitted in the remaining symbols other than the plurality of symbols constituting the resource unit including the transition gap.

6 Claims, 17 Drawing Sheets

FIG. 16

Time →

Frequency ↓

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_0$ | $M_6$ | $M_{12}$ | $M_{18}$ | $M_{24}$ | $M_{30}$ |
| $M_1$ | $M_7$ | $M_{13}$ | $M_{19}$ | $M_{25}$ | $M_{31}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

⋮

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_2$ | $M_8$ | $M_{14}$ | $M_{20}$ | $M_{26}$ | $M_{32}$ |
| $M_3$ | $M_9$ | $M_{15}$ | $M_{21}$ | $M_{27}$ | $M_{33}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

⋮

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_4$ | $M_{10}$ | $M_{16}$ | $M_{22}$ | $M_{28}$ | $M_{34}$ |
| $M_5$ | $M_{11}$ | $M_{17}$ | $M_{23}$ | $M_{29}$ | $M_{35}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

METHOD AND APPARATUS FOR TRANSMITTING UPLINK CONTROL SIGNAL IN RELAY STATION

CROSS-REFERENCE TO RELATED APPLICATIONS

This application claims the benefit of priority of U.S. Provisional applications 61/242,803 filed on Sep. 16, 2009, 61/245,131 filed on Sep. 23, 2009 and Korean Patent Application No. 10-2010-0030930 filed on Apr. 5, 2010, all of which are incorporated by reference in their entirety herein.

BACKGROUND OF THE INVENTION

1. Field of the Invention

The present invention relates to wireless communications, and more particularly, to a method and apparatus for transmitting an uplink control signal of a relay station in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain. In order to support the various schemes described above, a control signal must be transmitted between a mobile station (MS) and a base station (BS). Examples of the control signal include a channel quality indicator (CQI) for reporting a channel state from the MS to the BS, an acknowledgement/not-acknowledgement (ACK/NACK) signal in response to data transmission, a bandwidth request signal for requesting allocation of a radio resource, precoding information in a multiple antenna system, antenna information, etc. The control signal is transmitted through a control channel.

Meanwhile, a wireless communication system employing a relay station (RS) has recently been developed. The RS is employed for cell coverage extension and transmission capability improvement. A BS provides a service to an MS located in a coverage boundary of the BS via the RS, and thus can obtain an effect of extending the cell coverage. In addition, the RS improves signal transmission reliability between the BS and the MS, thereby improving transmission capacity. Even if the MS is located inside the coverage of the BS, the RS may be used when the MS is located in a shadow area.

The wireless communication system employing the RS requires a new frame structure different from the conventional frame structure. A frequency band used when the RS transmits a signal to the BS may be equal to a frequency band at which a signal is received from a relay MS. Alternatively, the frequency band used when the RS receives the signal from the BS may be equal to a frequency band at which a signal is transmitted to the relay MS. Due to self interference, it is difficult for the RS to simultaneously perform transmission and reception of a signal at the same frequency band. Therefore, a time for switching an operation mode between transmission and reception of the signal is required. In general, it is assumed that the RS cannot transmit or receive the signal during the operation mode switching time. Some subframes included in an RS frame may include a symbol used as a transition gap by considering the operation mode switching time. In this symbol, the RS cannot transmit an uplink control signal.

Therefore, when the conventional method of transmitting the uplink control signal between the BS and the MS is equally used between the BS and the RS, a problem may occur due to the transition gap. For example, there may be a problem in multiplexing of an uplink control signal transmitted by the RS and an uplink control signal transmitted by the MS or in maintaining orthogonality of multiplexed signals.

Accordingly, there is a need for a method of transmitting the uplink control signal by the RS to the BS in the RS frame including the transition gap.

SUMMARY OF THE INVENTION

The present invention provides a method and apparatus for transmitting an uplink control signal of a relay station.

According to an aspect of the present invention, a method of transmitting an uplink (UL) control signal of a relay station is provided. The method includes: configuring a UL relay zone for transmitting a signal by the relay station to a base station in a frame; configuring a resource unit including a plurality of symbols and a plurality of subcarriers to allocate the UL control signal in a subframe of the UL relay zone; and transmitting the UL control signal by using the resource unit, wherein, if a transition gap required for switching of signal transmission and reception of the relay station is included in the subframe, the UL control signal is transmitted in the remaining symbols excluding the plurality of symbols constituting the resource unit including the transition gap.

BRIEF DESCRIPTION OF THE DRAWINGS

FIG. 16 shows an example of resource allocation for a bandwidth request channel.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16e-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity, the following description will focus on the IEEE 802.16m. However, technical features of the present invention are not limited thereto.

Figure 1:
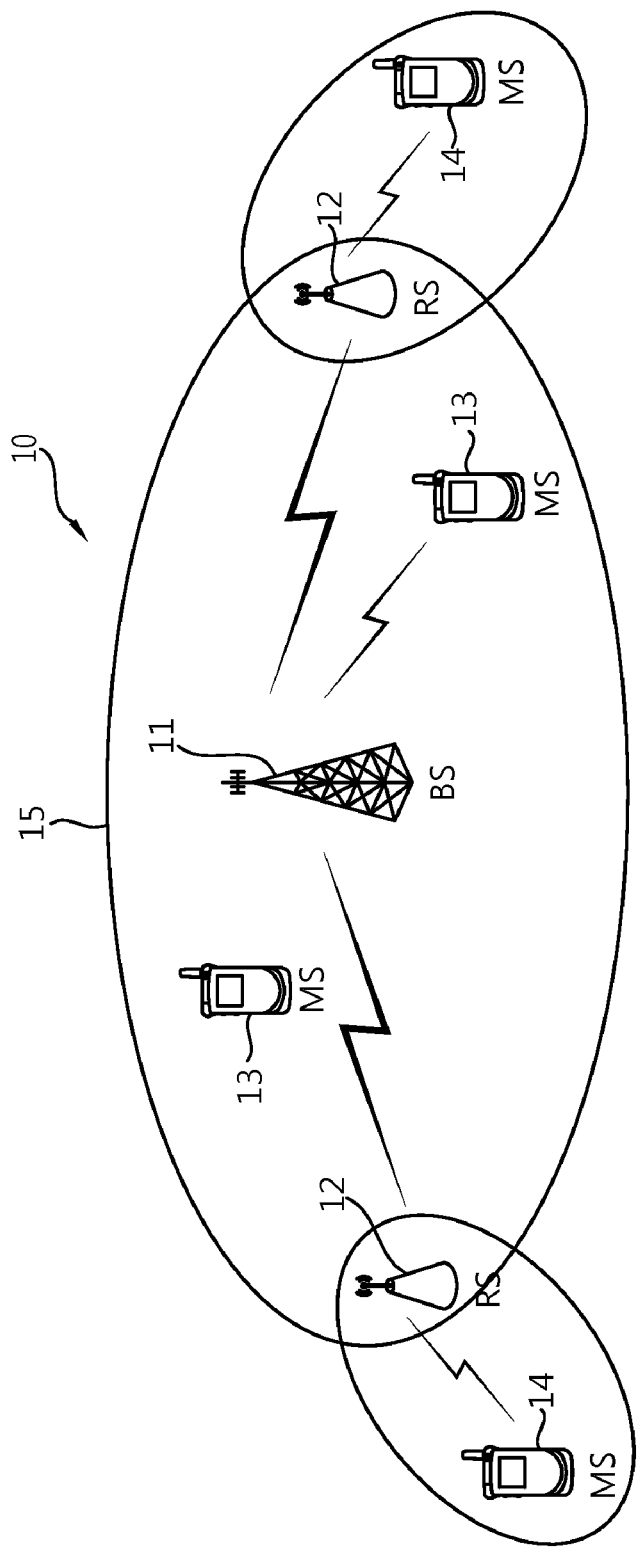
FIG. 1 shows a wireless communication system employing a relay station.

FIG. 1 shows a wireless communication system employing a relay station.

Referring to FIG. 1, a wireless communication system 10 employing a relay station (RS) 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a mobile station (MS) 13 and can be referred to as another terminology, such as an evolved node-B (eNB), a base transceiver system (BTS), an access point, an access network (AN), an advanced BS (ABS), etc. The BS 11 can perform functions such as connectivity between the RS 12 and an MS 14, management, control, resource allocation, etc.

The RS 12 is a device for relaying a signal between the BS 11 and the MS 14, and is also referred to as another terminology such as a relay node (RN), a repeater, an advanced RS (ARS), etc. A relay scheme used in the RS may be either amplify and forward (AF) or decode and forward (DF), and the technical features of the present invention are not limited thereto.

The MSs 13 and 14 may be fixed or mobile, and can be referred to as another terminology, such as an advanced mobile station (AMS), a user terminal (UT), a subscriber station (SS), a wireless device, a personal digital assistant (PDA), a wireless modem, a handheld device, an access terminal (AT), a user equipment (UE), etc. Hereinafter, a macro MS denotes an MS that directly communicates with the BS 11, and a relay MS denotes an MS that communicates with the RS 12. To improve a data transfer rate depending on a diversity effect, a macro MS 13 located in the cell of the BS 11 can also communicate with the BS 11 via the RS 12.

Between the BS and the macro MS, a downlink (DL) denotes communication from the BS to the macro MS, and an uplink (UL) denotes communication from the macro MS to the BS. Between the BS and the RS, a DL denotes communication from the BS to the RS, and a UL denotes communication from the RS to the BS. Between the RS and the relay MS, a DL denotes communication from the RS to the relay MS, and a UL denotes communication from the relay MS to the RS.

Figure 2:
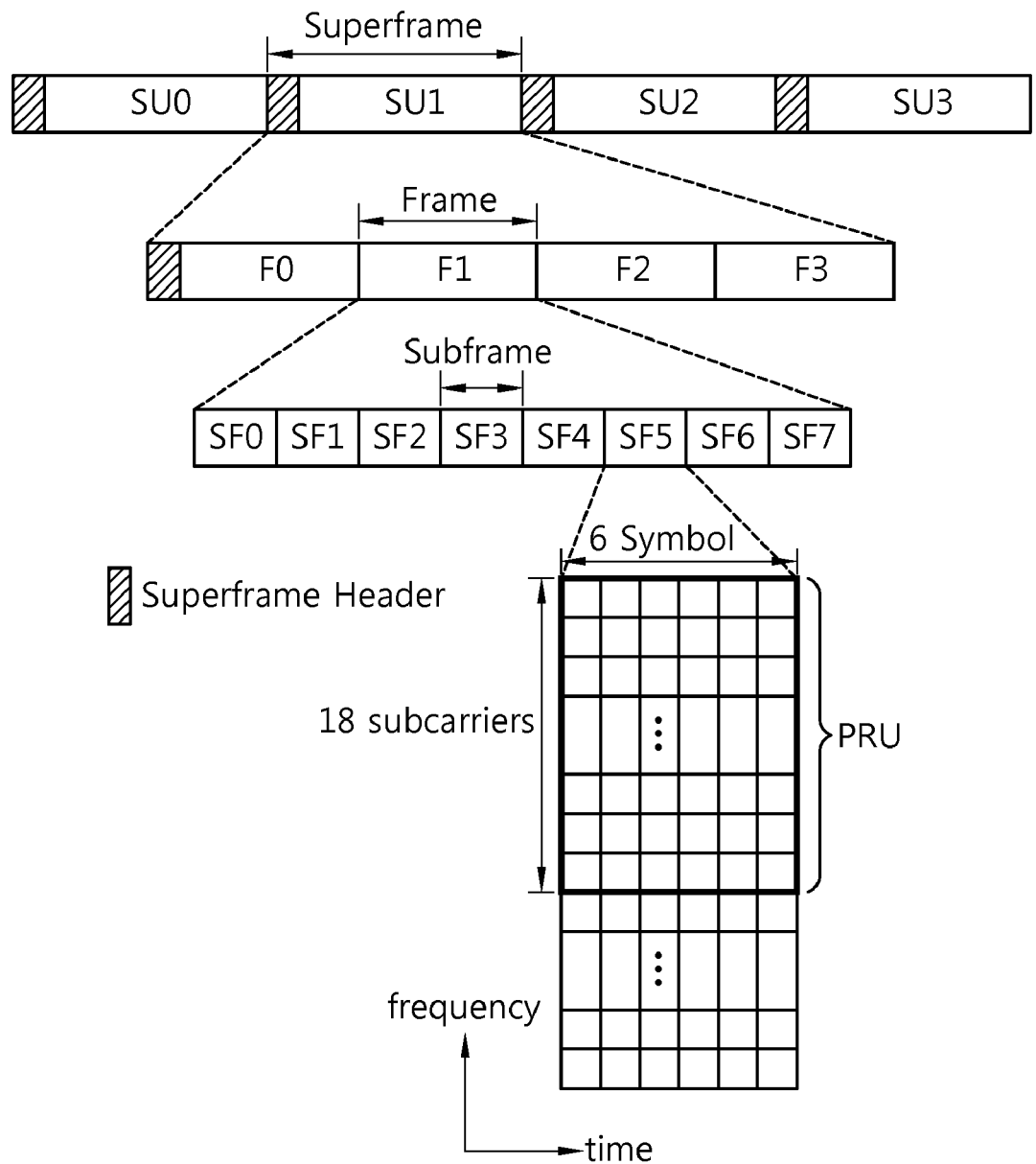
FIG. 2 shows an example of a subframe structure.

FIG. 2 shows an example of a subframe structure.

A superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of subframes included in the frame, or the like may change variously. The number of subframes included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH can be transmitted in every superframe.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length.

A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

One OFDM symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDM symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time, $T_b$(µs) | | | 91.4 | 128 | 102.4 | 91.4 | 91.4 |
| G = 1/8 | Symbol time, $T_s$(µs) | | 102.857 | 144 | 115.2 | 102.857 | 102.857 |
| | FDD | Number of OFDMA symbols per 5 ms frame | 48 | 34 | 43 | 48 | 48 |
| | | Idle time(µs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(µs) | 165.714 | 248 | 161.6 | 165.714 | 165.714 |
| G = 1/16 | Symbol time, $T_s$(µs) | | 97.143 | 136 | 108.8 | 97.143 | 97.143 |
| | FDD | Number of OFDMA symbols per 5 ms frame | 51 | 36 | 45 | 51 | 51 |
| | | Idle time(µs) | 45.71 | 104 | 104 | 45.71 | 45.71 |
| | TDD | Number of OFDMA symbols per 5 ms frame | 50 | 35 | 44 | 50 | 50 |
| | | TTG + RTG(µs) | 142.853 | 240 | 212.8 | 142.853 | 142.853 |
| G = 1/4 | Symbol time, $T_s$(µs) | | 114.286 | 160 | 128 | 114.286 | 114.286 |
| | FDD | Number of OFDMA symbols per 5 ms frame | 43 | 31 | 39 | 43 | 43 |
| | | Idle time(µs) | 85.694 | 40 | 8 | 85.694 | 85.694 |
| | TDD | Number of OFDMA symbols per 5 ms frame | 42 | 30 | 38 | 42 | 42 |
| | | TTG + RTG(µs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ is smallest power of two greater than $N_{used}$. A sampling factor $F_s$ is floor(n · BW/8000 × 8000), a subcarrier spacing $\Delta f$ is $F_s/N_{FFT}$, a useful symbol time $T_b$ is $1/\Delta f$, a CP time $T_g$ is $G \cdot T_b$, an OFDMA symbol time $T_s$ is $T_b + T_g$, and a sampling time is $T_b/N_{FFT}$.

Figure 3:
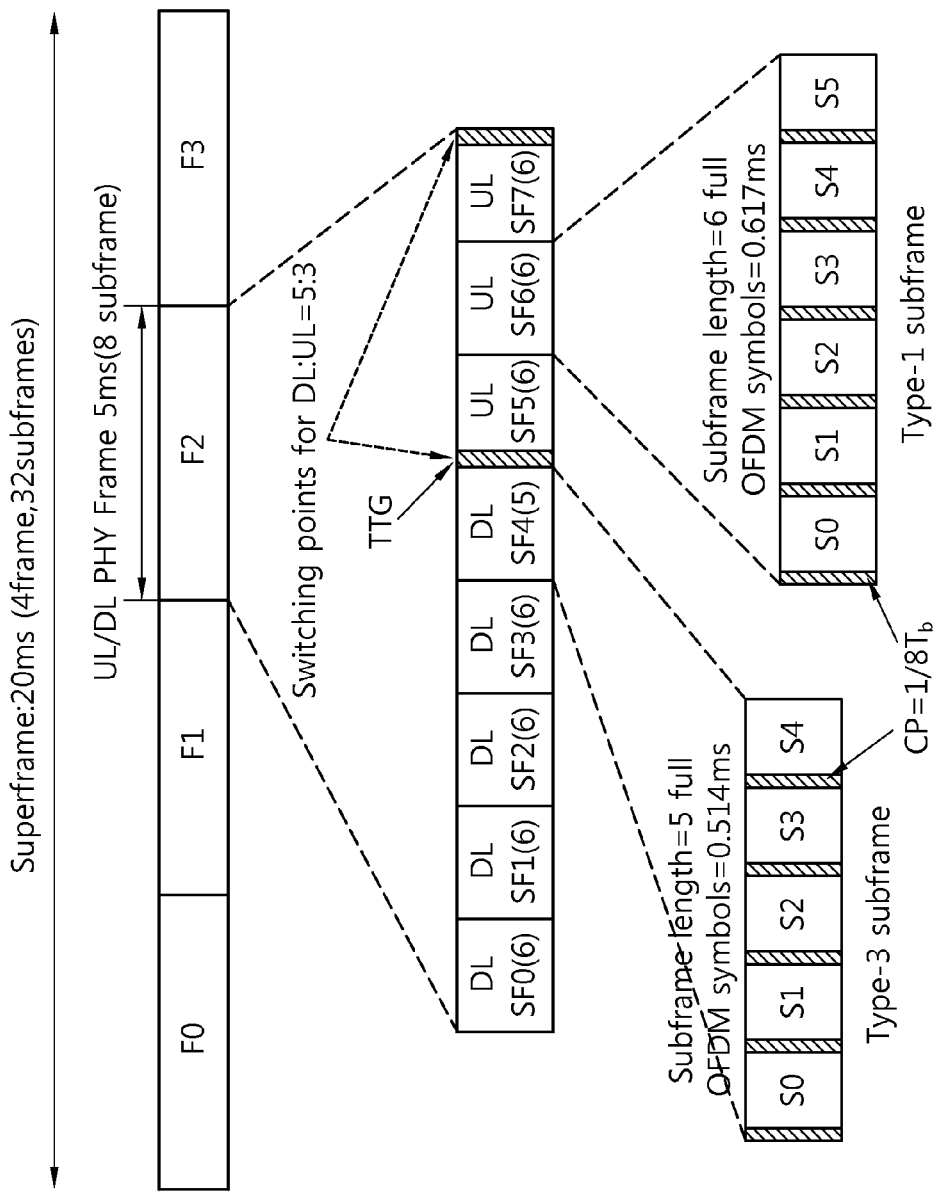
FIG. 3 shows an example of a time division duplexing (TDD) frame structure.

FIG. 3 shows an example of a TDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and a ratio of a DL subframe to a UL subframe is 5:3. The TDD frame structure of FIG. 3 can be used when a bandwidth is 5 MHz, 10 MHz, or 20 MHz. The last DL subframe SF4 includes 5 OFDM symbols, and the remaining subframes include 6 OFDM symbols.

Figure 4:
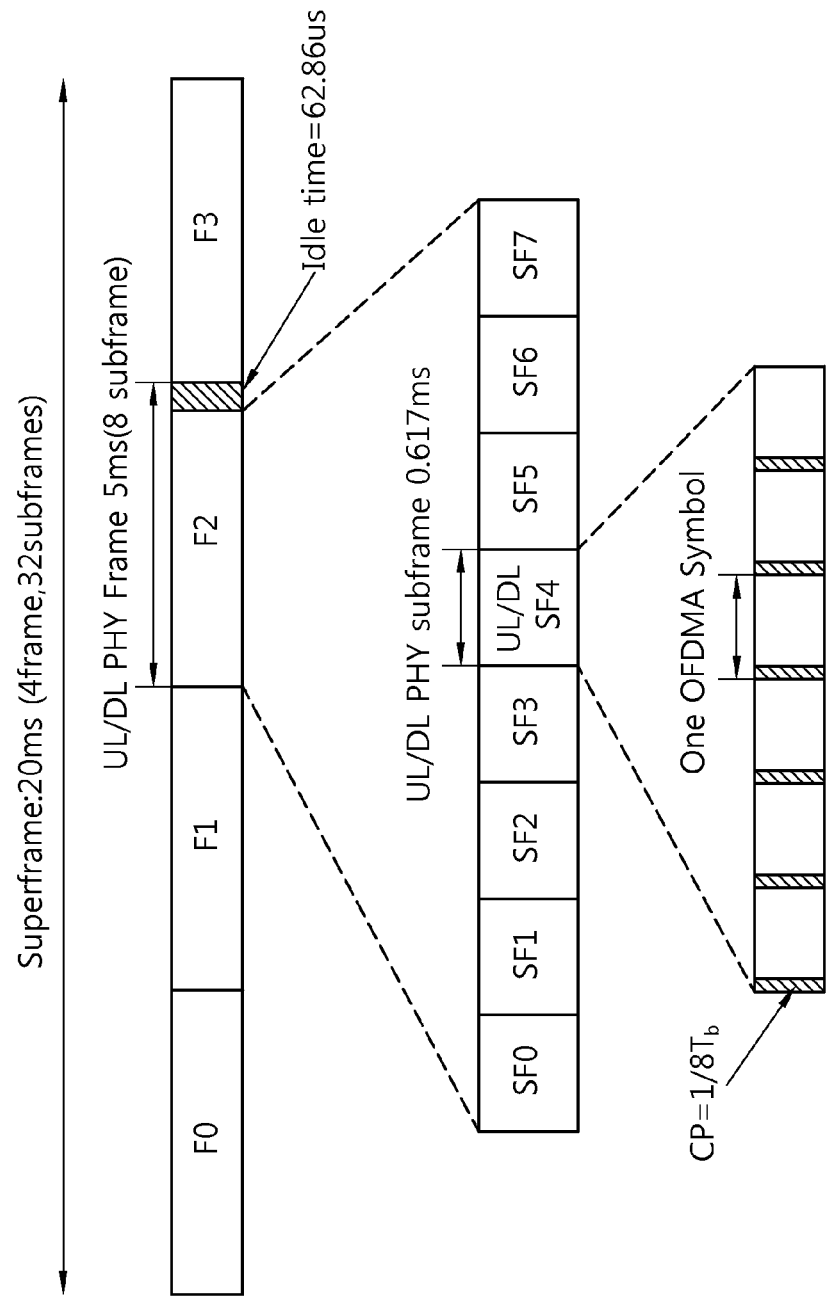
FIG. 4 shows an example of a frequency division duplexing (FDD) frame structure.

FIG. 4 shows an example of an FDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and all subframes include a DL region and a UL region. The FDD frame structure of FIG. 4 can be used when a bandwidth is 5 MHz, 10 MHz, or 20 MHz.

The aforementioned frame structures can be used between a BS and a macro MS. However, when an RS is included in a wireless communication system, it is difficult for the RS to use the same frame structure used between the BS and the macro MS. Since the RS has to transmit its DL control information (e.g., a preamble or a superframe header (SFH)), the RS requires a radio resource region capable of transmitting a signal to a relay MS in DL transmission. Further, since the RS receives a signal from the relay MS and thereafter retransmits it to the BS by performing decoding, the RS requires a radio resource region capable of transmitting the signal in UL transmission. The BS also requires the radio resource region capable of receiving a signal in UL transmission. In addition, the RS transmits a signal to the relay MS or receives a signal from the BS in the same frequency band. And the RS receives a signal from the relay MS or transmits a signal to the BS in the same frequency band. Therefore, the RS requires a transition gap when switching a signal transmission/reception operation. In general, it is assumed that the RS cannot receive or transmit a signal in the transition gap. By considering such an aspect, a frame structure that can be used in the wireless communication system employing the RS may has the structure of FIG. 5 to FIG. 8 to be described below.

First, terms will be defined.

In a BS frame, a DL access zone denotes a radio resource region in which a BS transmits a signal to a macro MS. A DL relay zone denotes a radio resource region in which the BS transmits a signal to an RS and/or a macro MS. A UL access zone denotes a radio resource region in which the BS receives a signal from the macro MS. A UL relay zone denotes a radio resource region in which the BS receives a signal from the RS and/or the macro MS.

In an RS frame, the DL access zone denotes a radio resource region in which the RS transmits a signal to the relay MS. The DL relay zone denotes a radio resource region in which the RS receives a signal from the BS. The UL access zone denotes a radio resource region in which the RS receives a signal from the relay MS. The UL relay zone denotes a radio resource region in which the RS transmits a signal to the BS.

In a TDD frame, between a transmission region (e.g DL access zone in a BS frame) and a following reception region (e.g UL access zone in a BS frame), a transmit/receive transition gap (TTG) is located. Between the reception region (e.g UL access zone in a BS frame) and a following transmission region (e.g DL access zone in a following frame), a receive/transmit transition gap (RTG) is located. In the TTG or the RTG, an idle time may be included according to a CP length to avoid inter-symbol interference.

Examples of the transition gap in a RS frame include a relay transmit to receive transition interval (R-TTI) and a relay receive to transmit transition interval (R-RTI). The R-TTI is a time that can be inserted while switching from an operation of transmitting a signal by the RS to the relay MS to an operation of receiving signal from the BS. The R-TTI may be one symbol. The R-RTI is a time that can be inserted while switching from an operation of receiving a signal by the RS from the relay MS to an operation of transmitting a signal to the BS. The R-RTI may be one symbol. The R-TTI may be determined such that a round trip delay (RTD) and an ARS transmit/receive transition gap (ARSTTG) between the RS and a super-ordinate station of the RS can be aligned. The R-RTI may be determined such that an RTD and an ARS receive/transmit transition gap (ARSRTG) between the RS and the super-ordinate station of the RS can be aligned.

FIG. 5 to FIG. 8 show examples of a frame structure including a transition gap.

Figure 5:
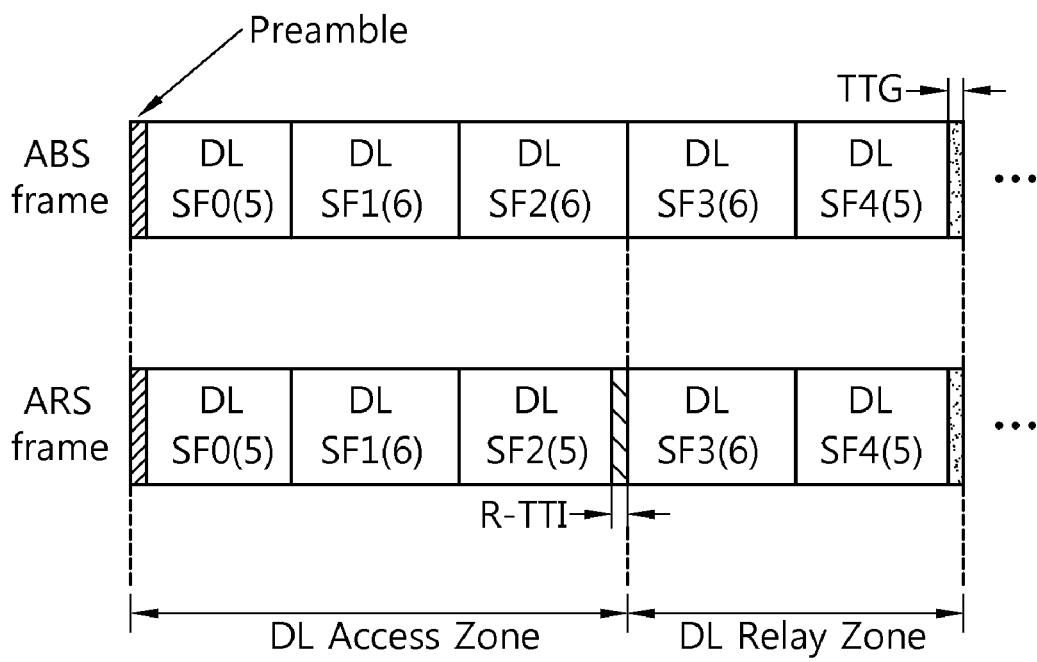
FIG. 5 to FIG. 8 show examples of a frame structure including a transition gap.

FIG. 5 shows a frame structure when a transition gap is included in a DL access zone. Referring to FIG. 5, an R-TTI can be inserted in a last symbol of a DL access zone of an RS frame (ARS frame).

Figure 6:
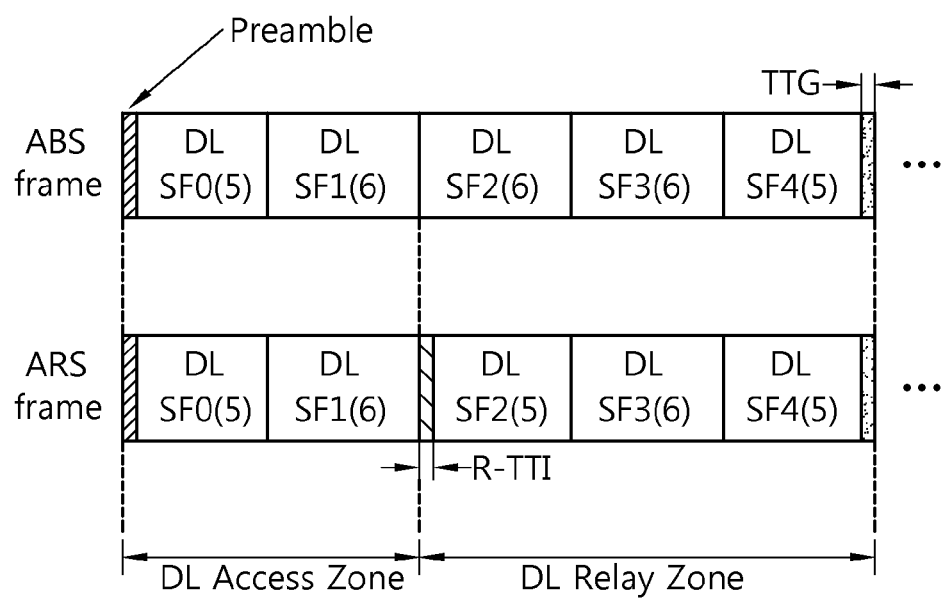

FIG. 6 shows a frame structure when a transition gap is included in a DL relay zone. Referring to FIG. 6, an R-TTI can be inserted in a first symbol of a DL relay zone of an RS frame.

Figure 7:
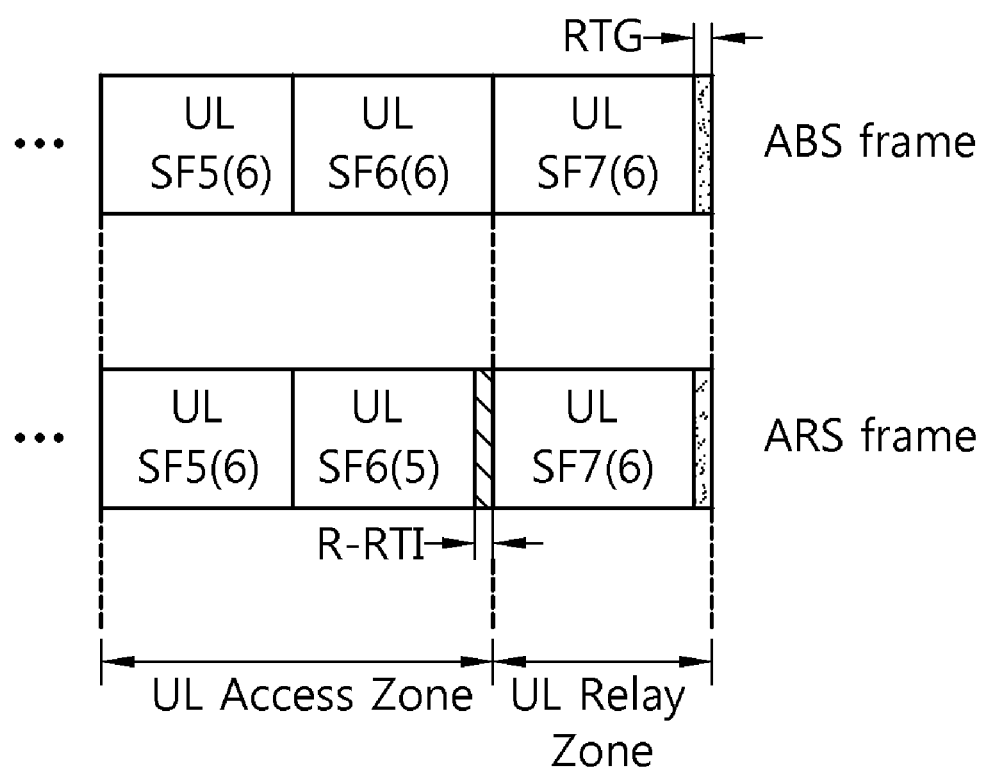

FIG. 7 shows a frame structure when a transition gap is included in a UL access zone. Referring to FIG. 7, an R-RTI can be inserted in a last symbol of a UL access zone of an RS frame.

Figure 8:
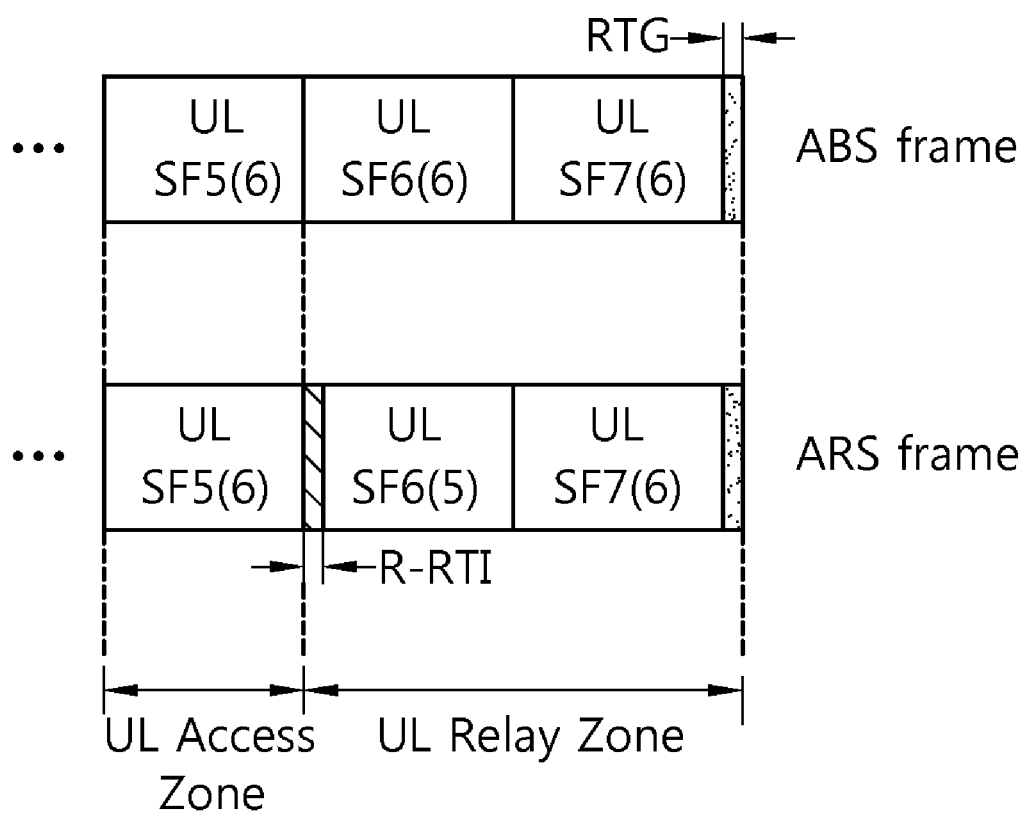

FIG. 8 shows a frame structure when a transition gap is included in a UL relay zone. Referring to FIG. 8, an R-RTI can be inserted in a first symbol of a UL relay zone.

In FIG. 8, in a 5-symbol subframe (i.e., UL SF 6) including a transition gap, the RS can transmit a signal to the BS by using 5 symbols excluding a $1^{st}$ symbol. For example, the RS can transmit the signal after puncturing a symbol including the transition gap in the subframe including the transition gap. On the other hand, the macro MS can transmit a signal to the BS by using a type-1 subframe (i.e., a subframe having 6 symbols). Then, the BS receives the type-1 subframe from the macro MS, and receives only 5 symbols excluding the $1^{st}$ symbol from the RS.

Figure 9:
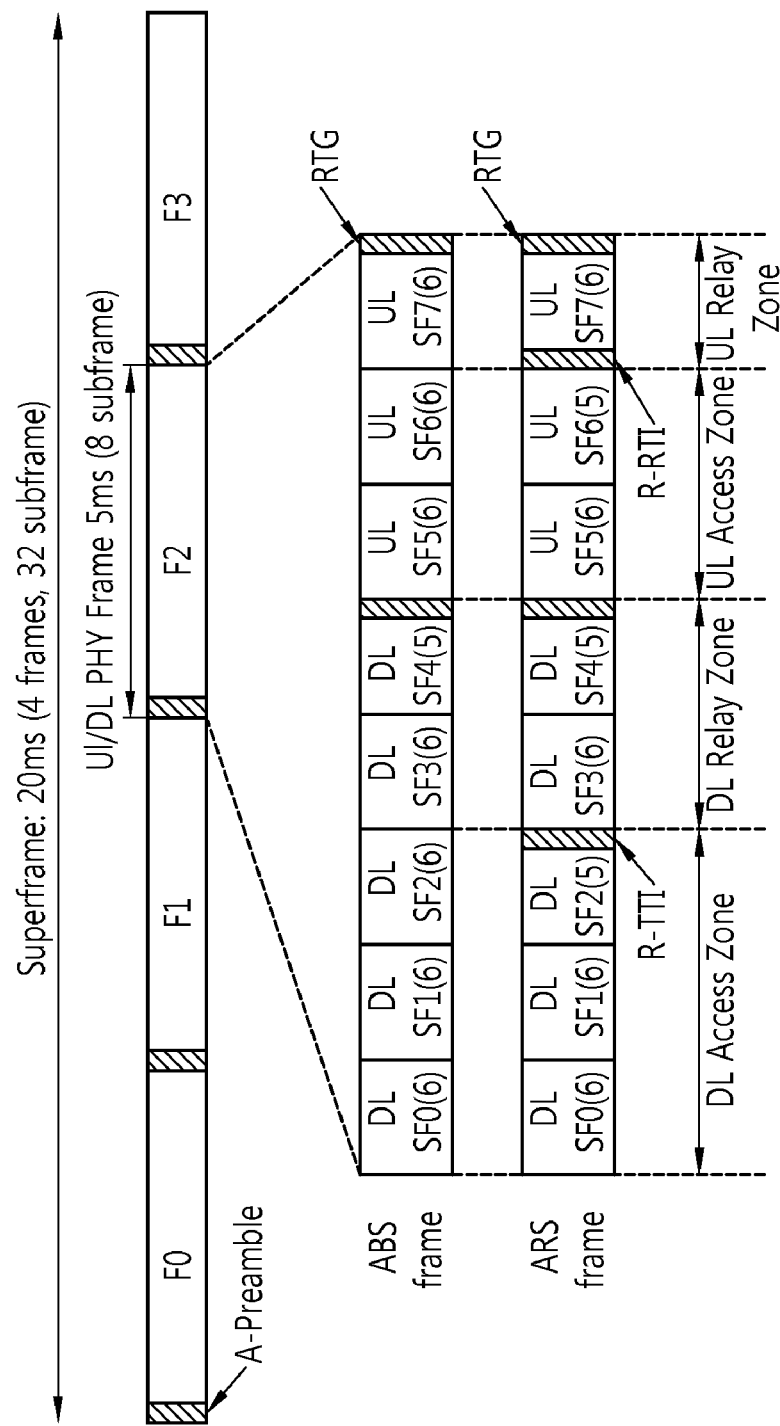
FIG. 9 shows an example of a TDD frame structure.

FIG. 9 shows an example of a TDD frame structure.

Referring to FIG. 9, a ratio of a DL subframe and a UL subframe is 5:3. The TDD frame structure can be used, for example, at any one of bandwidths of 5, 10, and 20 MHz when G=⅛. The number of subframes allocated to a DL relay zone is 2. The number of subframes allocated to a UL relay zone is 1. In an RS TDD frame, an R-TTI may be included in a last symbol of the DL access zone in DL transmission, and an R-RTI may be included in a $1^{st}$ symbol of the UL relay zone in UL transmission.

Figure 10:
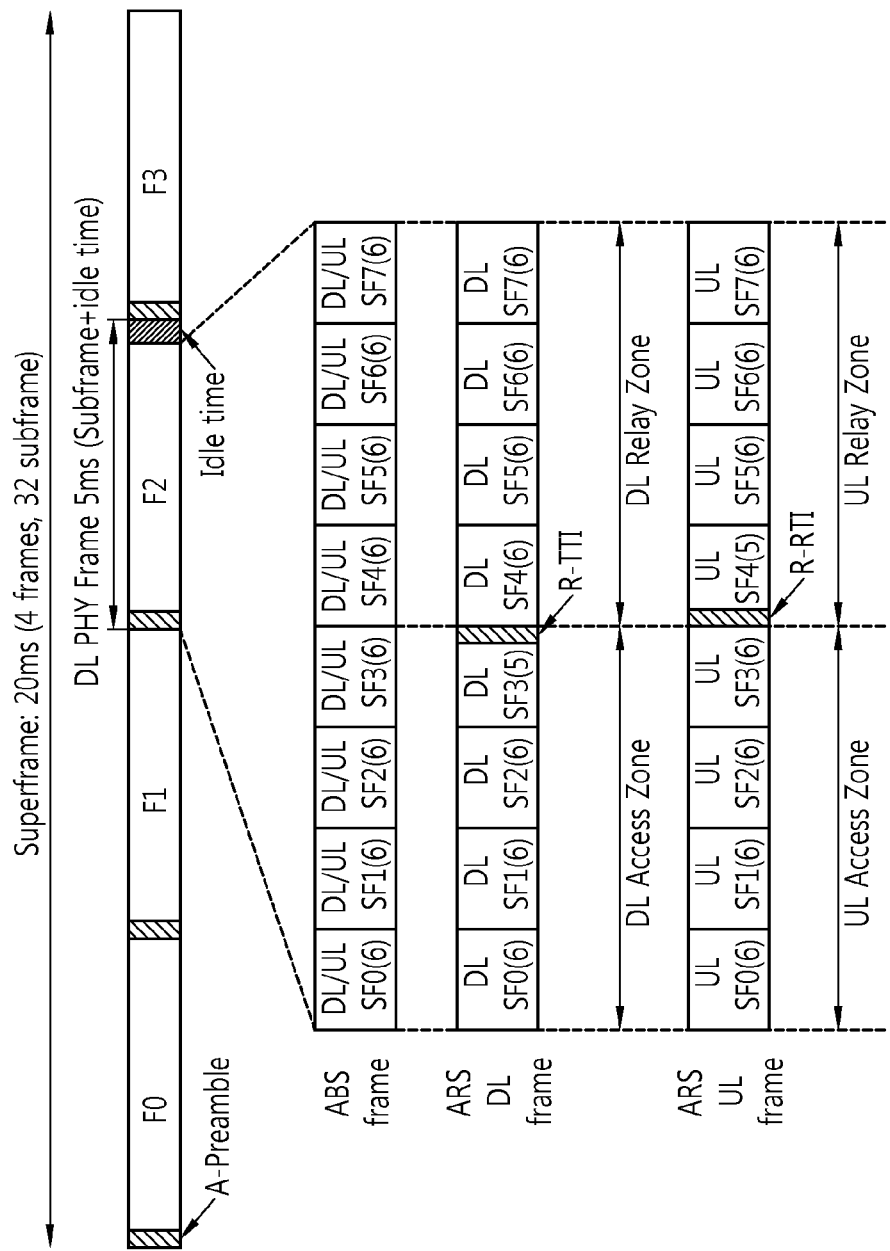
FIG. 10 shows an example in which a transition gap is included in an FDD frame.

FIG. 10 shows an example in which a transition gap is included in an FDD frame.

Referring to FIG. 10, in case of an FDD DL frame of an RS frame, an R-TTI is included in a last symbol of a DL access zone and an R-RTI is included in a $1^{st}$ symbol of a UL relay zone for example.

If an RS intends to transmit a UL control signal through a UL control channel to a BS in the UL SF 6 in the frame structure of FIG. 8 above, a $1^{st}$ symbol cannot be used, which can be problematic. First, a method of transmitting the UL control channel and the UL control signal between the BS and an MS will be described.

Examples of the UL control channel of the IEEE 802.16m system include a fast feedback channel (FFBCH), a hybrid automatic repeat request (HARQ) feedback control channel (HFBCH), a sounding channel, a ranging channel, a bandwidth request channel (BRCH), etc.

The fast feedback channel carries feedback of a CQI and/or MIMO information. There are two types of fast feedback channel, i.e., a primary fast feedback channel (PFBCH) and a secondary fast feedback channel (SFBCH). The PFBCH carries 4 to 6-bit information, and provides wideband CQI and/or MIMO feedback. The SFBCH carries 7 to 24-bit information, and provides narrowband CQI and/or MIMO feedback. The fast feedback channel can be allocated to a predetermined position defined in a broadcast message. The fast feedback channel can be periodically allocated to the MS. Through the fast feedback channel, feedback information of a plurality of MSs can be transmitted by being multiplexed using time division multiplexing (TDM), frequency division multiplexing (FDM), and code division multiplexing (CDM). In response to data using HARQ, an HARQ feedback channel through which an ACK/NACK signal is transmitted can start at an offset predetermined from data transmission.

The BRCH is a channel for requesting a radio resource to transmitting UL data or a control signal intended to be transmitted by the MS.

The HFBCH is a channel for transmitting an acknowledgement (ACK)/non-acknowledgement (NACK) signal in response to data transmission.

The FFBCH, the BRCH, the HFBCH, etc., can be located in any position in a UL subframe or frame.

Figure 11:
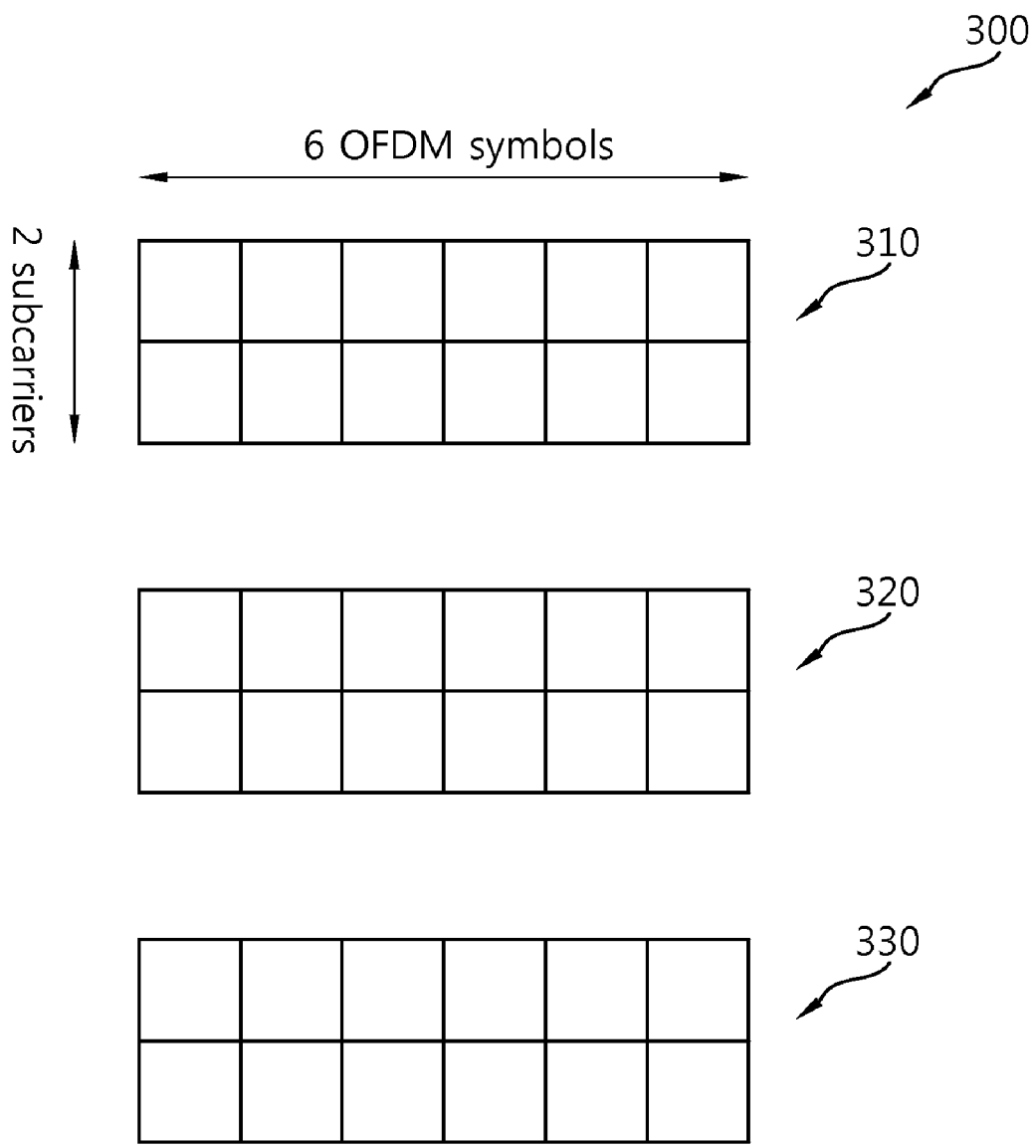
FIG. 11 shows an example of a resource unit used in an uplink control channel.

FIG. 11 shows an example of a resource unit used in a UL control channel.

A resource unit 300 is a resource allocation unit used in transmission of the UL control channel, and is also referred to as a tile. The tile 300 may be a physical resource allocation unit or may be a logical resource allocation unit. The control channel includes at least one tile 300. The tile 300 consists of at least one subcarrier of a frequency domain over at least one OFDM symbol of a time domain. The tile 300 denotes a group of a plurality of subcarriers consecutive in the time domain and the frequency domain. The tile 300 includes a plurality of data subcarriers and/or pilot subcarriers. A sequence of a control signal can be mapped to the data subcarrier. A pilot for channel estimation can be mapped to the pilot subcarrier.

The tile 300 includes three mini units 310, 320, and 330. The mini unit is also referred to as a mini-tile. The tile 300 may consist of a plurality of mini-tiles. The mini-tile may consist of at least one subcarrier of the frequency domain over at least one OFDM symbol of the time domain. For example, each of the mini-tiles 310, 320, and 330 includes two contiguous subcarriers across 6 orthogonal frequency division multiplexing (OFDM) symbols. The mini-tiles 310, 320, and 330 in the tile 300 may not be contiguous with one another in the frequency domain. This implies that at least one mini-tile of another tile can be arranged between the $1^{st}$ mini-tile 310 and the $2^{nd}$ mini-tile 320 and/or the $2^{nd}$ mini-tile 320 and the $3^{rd}$ mini-tile 330. By deploying the mini-tiles 310, 320, and 330 in the tile 300 in a distribute manner, a frequency diversity can be obtained.

A resource unit can be used as a unit of resource allocation for a feedback channel. That is, the feedback channel may consist of 3 mini-tiles with a 2×6 size (subcarrier×OFDM symbol). Further, the feedback channel may be configured by allocating a DRU among logical resources. One DRU may consist of 3 distributed tiles with a 6×6 size. The tile may be divided into 3 contiguous mini-tiles with a 2×6 size. Considering that the mini-tile is a resource unit used in the feedback channel, the mini-tile can be referred to as a feedback mini-tile (FMT).

The number of OFDM symbols in the time domain and/or the number of subcarriers in the frequency domain included in the mini-tile are shown for exemplary purposes only, and thus the present invention is not limited thereto. The number of OFDM symbols included in the mini-tile may vary depending on the number of OFDM symbols included in a subframe. For example, if the number of OFDM symbols included in one subframe is 6, the number of OFDM symbols included in the mini-tile may be 6.

The OFDM symbol refers to a duration in the time domain, and is not necessarily limited to an OFDM/OFDMA-based system. Thus, the OFDM symbol can be referred to as other terms such as a symbol duration, and technical features of the present invention are not limited to a specific multiple access scheme even if the term 'OFDM symbol' is used herein. Further, the subcarrier refers to an allocation unit in the frequency domain. Although the allocation unit is one subcarrier herein, a subcarrier group can also be used as the allocation unit.

Figure 12:
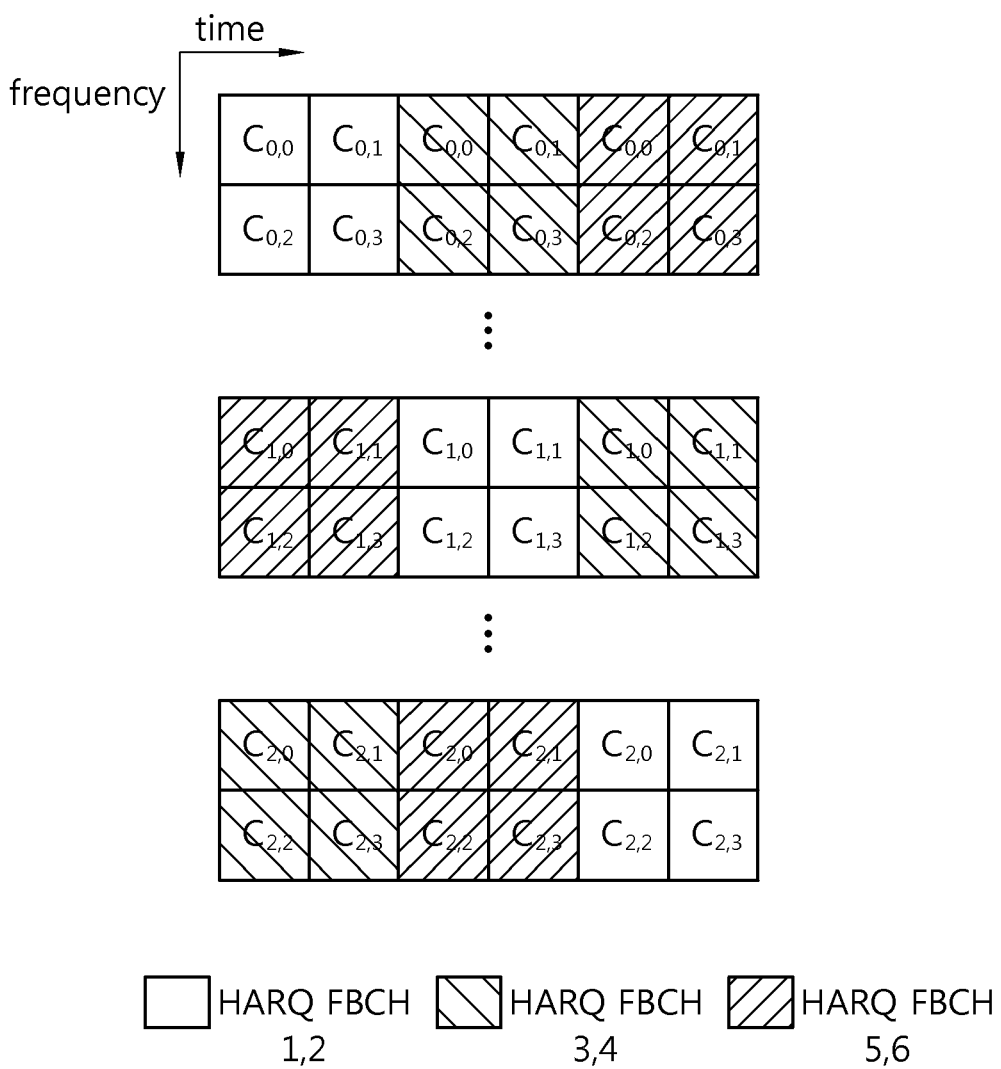
FIG. 12 shows an example of resource allocation for a hybrid automatic repeat request (HARQ) feedback control channel (HFBCH).

FIG. 12 shows an example of resource allocation for an HFBCH.

Resources of the HFBCH exist in three distributed feedback mini-tile (FMT) with a 2×6 size. Each FMT can be divided into an HARQ mini-tile (HMT) with a 2×2 size. That is, in the HFBCH, an HMT group consisting of three 2×2 HMTs may be a unit of one HFBCH. A pair of HFBCHs is allocated to the HMT group. Orthogonal sequences as shown in the following table are mapped to the respective HMTs.

TABLE 2

| Sequence index | Orthogonal sequence | 1-bit Feedabck |
|---|---|---|
| 0 | [+1 +1 +1 +1] | Even numbered channel ACK |
| 1 | [+1 −1 +1 −1] | Even numbered channel NACK |
| 2 | [+1 +1 −1 −1] | Odd numbered channel ACK |
| 3 | [+1 −1 −1 +1] | Odd numbered channel NACK |

In FIG. 12, ($C_{i,0}$, $C_{i,1}$, $C_{i,2}$, $C_{i,3}$, i=0, 1, 2) denotes an orthogonal sequence given by Table 2 above, where i denotes an HMT index. In each HMT group, orthogonal sequences are mapped to respective HMTs, and thus orthogonality is maintained.

When the aforementioned method is equally applied to an RS, there may be a problem in transmission of a UL control signal. When a $1^{st}$ symbol in a UL relay zone of an RS frame is used as a transition gap such as an R-RTI, the RS cannot transmit the control signal in the $1^{st}$ symbol. Then, a problem in which orthogonality is not maintained in HMTs allocated to $1^{st}$ and $2^{nd}$ symbols may occur.

In addition, when HFBCH signals transmitted by a macro MS and the RS are transmitted by being multiplexed, a BS can receive an HMT from the macro MS in two symbols, whereas the BS can receive an HMT from the RS in one symbol.

Figure 13:
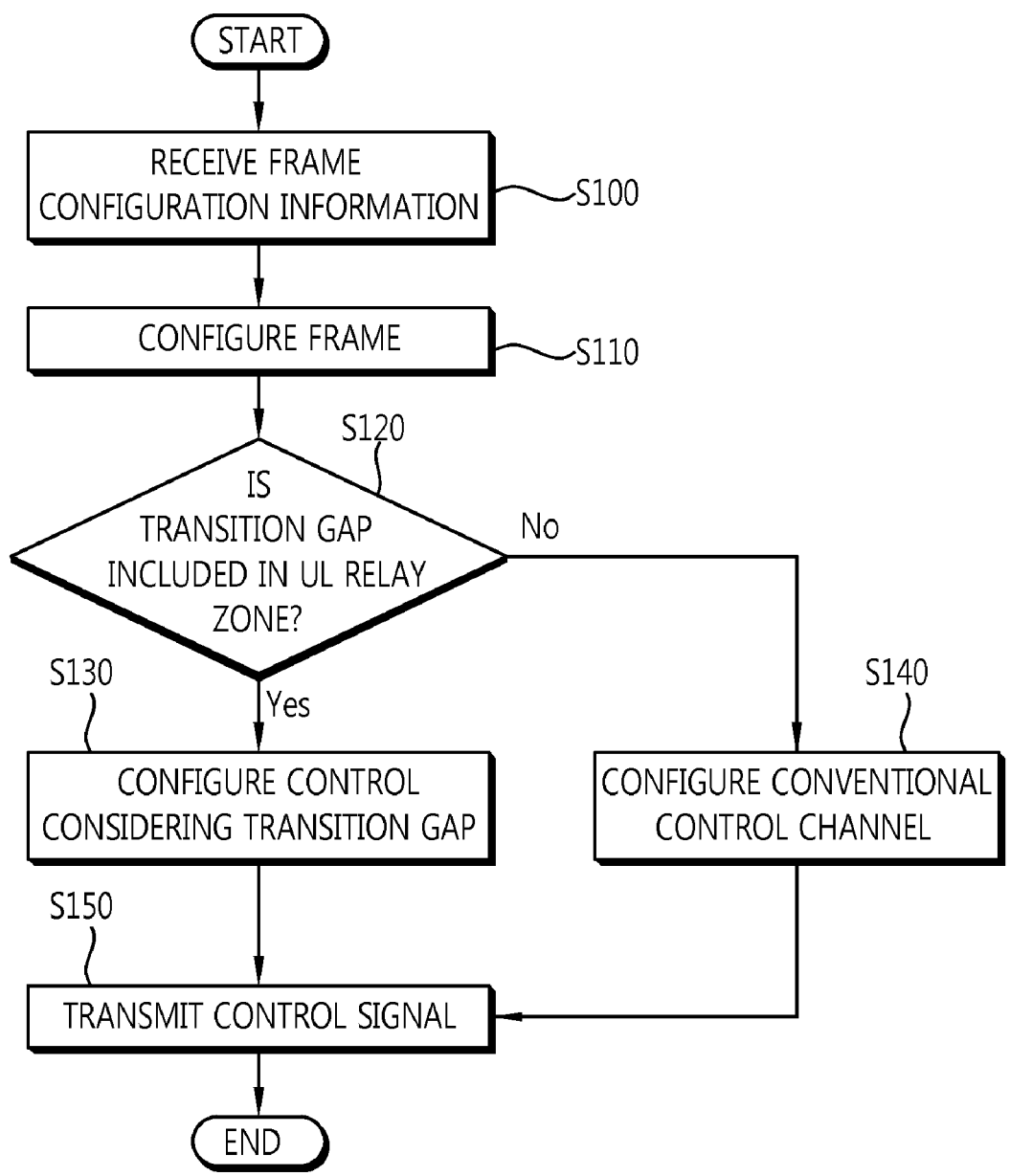
FIG. 13 is a flowchart showing a control signal transmission method of a relay station according to an embodiment of the present invention.

FIG. 13 is a flowchart showing a control signal transmission method of an RS according to an embodiment of the present invention.

The RS receives frame configuration information from a BS (step S100). By using the frame configuration information, the RS configures a DL access zone, a DL relay zone, a UL access zone, and a UL relay zone in a frame (step S110). The RS can configure a resource unit consisting of a plurality of symbols and a plurality of subcarriers for allocating a UL control signal in a subframe of the UL relay zone. For example, in case of an HFBCH, the resource unit may be an HMT with a 2×2 size in each of 3 distributed FMTs with a 2×6 size. In case of a BRCH, the resource unit may be a 6×6 tile.

The RS determines whether a symbol used as a transition gap is included in the UL relay zone (step S120). For example, the RS can determine whether a $1^{st}$ symbol of the UL relay zone is used as the transition gap.

If the symbol used as the transition gap exists in a type-1 UL subframe, only 5 symbols can be used. In this case, the RS configures a control channel by considering the transition gap (step S130). The control channel configured by considering the transition gap is used in a method of transmitting a control channel in a subframe in which the number of available symbols is less than the number of originally available symbols due to the transition gap, for example, in a subframe in which only 5 symbols are available. The method of configuring the control channel by considering the transition gap will be described below. The RS transmits a control signal to the BS through the configured control channel (step S150).

If the UL relay zone does not include the transition gap, the control channel can be configured by using the conventional control channel configuration method (step S140). For example, if the $1^{st}$ symbol of the UL relay zone is not used as the transition gap, the RS can configure the control channel according to the conventional control channel configuration method. When using the conventional control channel configuration method, for example, in case of the HFBCH, resources for the HFBCH can be allocated according to the method described above with reference to FIG. 10.

Figure 14:
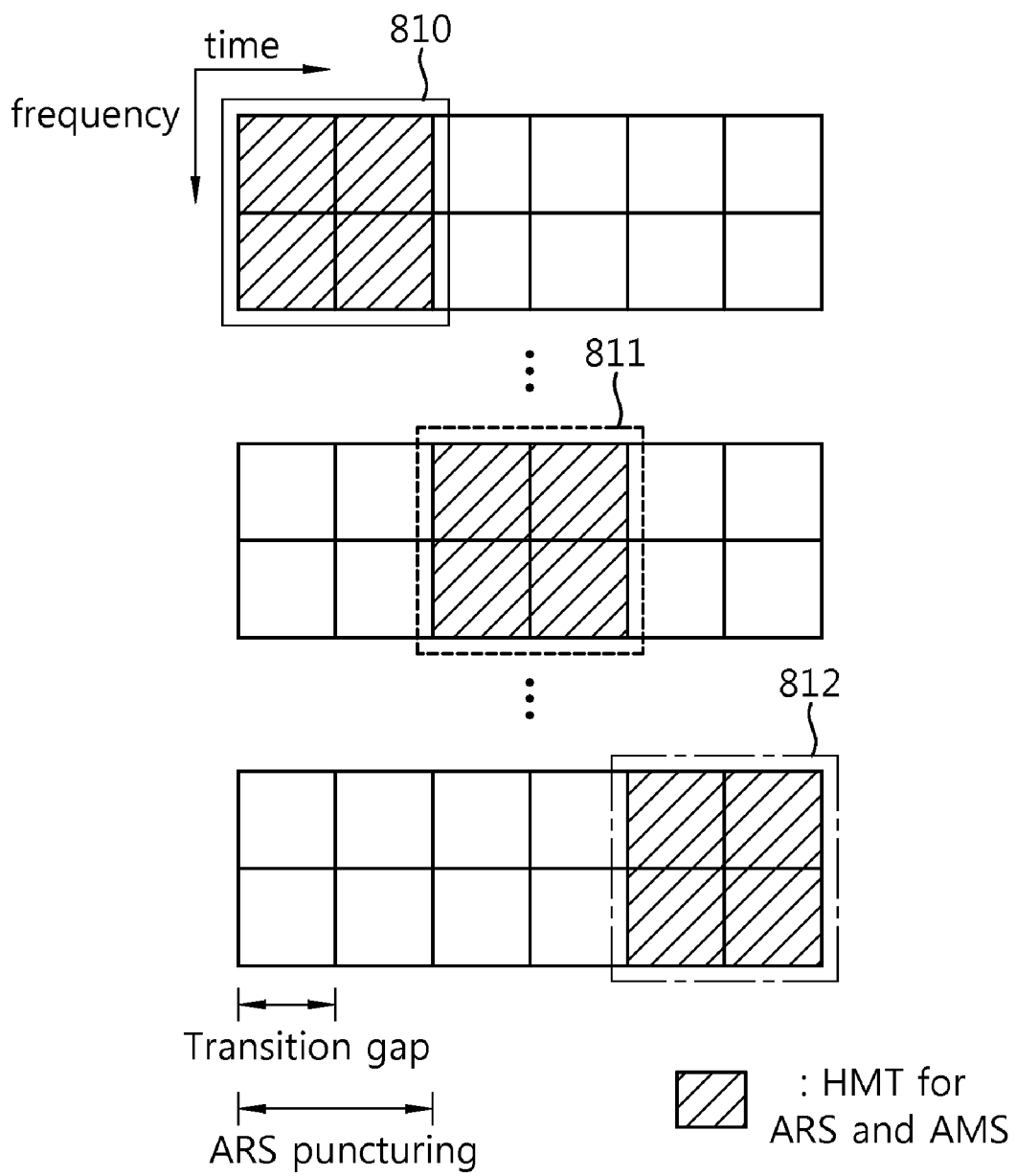
FIG. 14 shows an example of configuring an HFBCH by considering a transition gap.

FIG. 14 shows an example of configuring an HFBCH by considering a transition gap.

If a $1^{st}$ symbol in a subframe of a UL relay zone is used as a transition gap (e.g., an R-RTI), an RS may not transmit $1^{st}$ and $2^{nd}$ symbols in a $1^{st}$ subframe but transmit only the remaining symbols. That is, the RS may transmit an HARQ ACK/NACK signal in the remaining symbols other than the two symbols constituting a resource unit including a symbol in which the transition gap is located.

For example, the RS may deploy the HARQ ACK/NACK signal also in the resource unit of the two symbols and thereafter puncture the two symbols and transmit other symbols included in the subframe. Alternatively, the RS may neither deploy the HARQ ACK/NACK signal from the beginning in the resource unit of the two symbols nor transmit the two symbols.

As such, when the RS transmits only the remaining symbols other than the first two symbols of the UL relay zone, it is possible to prevent orthogonality from being broken in HMTs deployed in the first two symbols.

If the RS transmits only the remaining symbols other than the first one symbol used as the transition gap in the UL relay zone, orthogonality based on orthogonal sequences is not maintained in an HMT-1 810 received by a BS. For example, if an HFBCH pair of a macro MS and the RS is transmitted in the HMT-1 810, only an HFBCH signal transmitted by the macro MS is received in the $1^{st}$ symbol, and an HFBCH signal transmitted by the macro MS and the RS is received in the $2^{nd}$ symbol. Therefore, orthogonality based on the orthogonal sequences is not maintained.

On the other hand, according to the present invention, orthogonality is maintained in the HMT-1 810 since the BS receives only the HFBCH signal transmitted by the macro MS. Further, in an HMT-2 811 and an HMT-3 812, the HFBCH signal transmitted by the macro MS and the RS is received while maintaining orthogonality, thereby increasing reliability.

Figure 15:
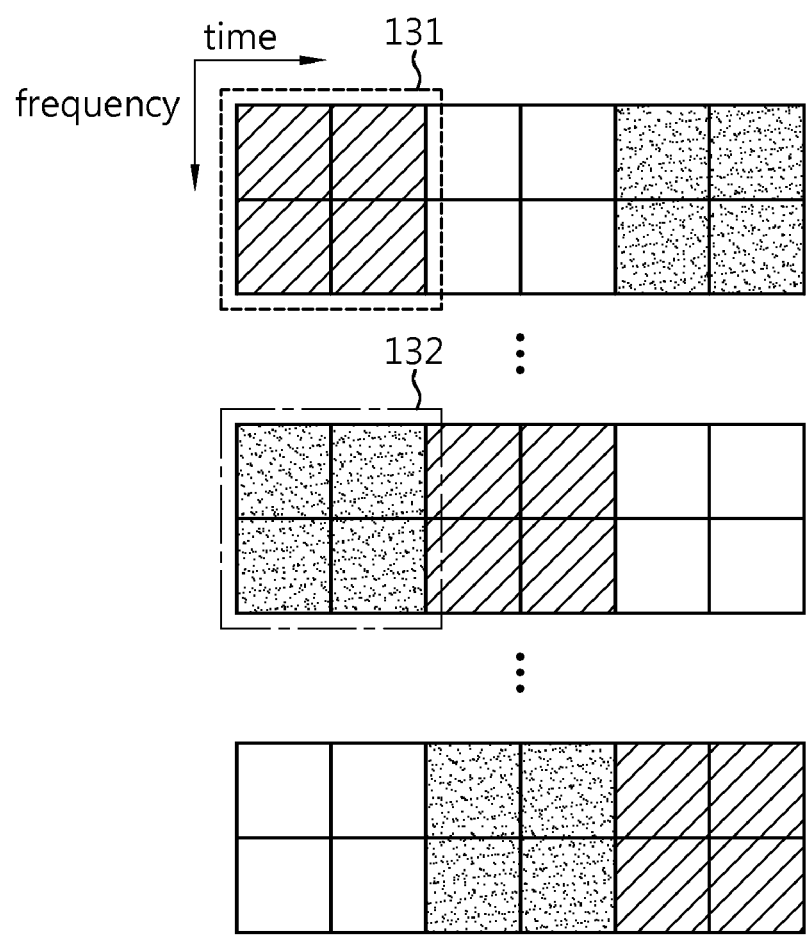
FIG. 15 shows another example of configuring an HFBCH by considering a transition gap.

FIG. 15 shows another example of configuring an HFBCH by considering a transition gap.

Referring to FIG. 15, a BS can allocate an HMT to which an HFBCH for an MS is allocated and an HMT to which an HFBCH for an RS is allocated by distinguishing the HMTs in a time-frequency domain. That is, the HFBCHs of the MS and the RS can be prevented from being CDM-multiplexed in the same HMT. Then, even if the RS transmits the remaining symbols other than a $1^{st}$ symbol in an HMT-1 131, only orthogonality on the HMT-1 131 of the RS is broken, and interference on an HARQ ACK/NACK signal transmitted by the MS in an HMT-1' 132 does not occur. The RS can allocate a resource for the HFBCH by receiving control channel allocation information from the BS. Although the HFBCH is described above as an example of the control channel, the present invention is not limited thereto.

In addition, although a case of using the $1^{st}$ symbol of the UL relay zone is used as the transition gap in the above example described with reference to FIG. 14 and FIG. 15, the present invention is not limited thereto. For example, the present invention can also apply to a case where a last symbol of the UL relay zone is used as the transition gap. In this case, however, the RS may not transmit last two symbols in a UL subframe including the transition gap. Alternatively, by allocating a radio resource of a time-frequency domain different from that of the MS, the RS may transmit the HFBCH to the BS.

The present invention can also apply to, for example, to a bandwidth request channel.

FIG. 16 shows an example of resource allocation for a bandwidth request channel.

The bandwidth request channel may consist of 3 distributed bandwidth request (BR) tiles. The BR tile may be a radio resource region consisting of 6 symbols and 6 subcarriers. The BR tile may include a preamble region in which a preamble is allocated and a data region in which data is allocated. The preamble is transmitted by using the preamble region. The data is transmitted by using the data region. In each BR tile, the preamble region is allocated across 6 symbols in a time domain and 4 subcarriers in a frequency domain. In each BR tile, the data region is allocated across 6 symbols in the time domain and 2 subcarriers in the frequency domain. In FIG. 16, a region marked with Pr may be the preamble region, and a region marked by M may be the data region. The bandwidth request channel may not exist in a subframe or up to two bandwidth request channels can be transmitted.

Scheduling information on the bandwidth request channel, i.e., information regarding in which subframe a bandwidth request will be performed and which period and radio resource will be used, can be transmitted by the BS to the RS and the MS by using a superframe header or a broadcast/multicast signal.

However, when some symbols of the UL relay zone of the RS frame (e.g., a $1^{st}$ symbol or last symbol of the UL relay zone) is used as an R-RTI or an R-TTI, there is a problem in that orthogonality is broken between a bandwidth request channel transmitted by the MS and a bandwidth request channel transmitted by the RS.

To solve such a problem, the BS can allocate a bandwidth request channel region to be allocated to the MS and a bandwidth request channel region to be allocated to the RS to a UL subframe including the transition gap by separating the regions.

In this case, the MS can transmit the bandwidth request channel to the BS according to the conventional method in the same manner as described above with reference to FIG. 16. Further, the RS can transmit the bandwidth request channel by using a new bandwidth request channel region allocated by the BS. For example, if one or more UL subframes exist in the UL relay zone, the bandwidth request channel of the RS can be allocated to a UL subframe not including the transition gap (e.g., R-RTI). In this case, a resource region to which the bandwidth request channel of the RS is allocated may be identical to a resource region in which the bandwidth request channel of the MS is allocated. In the remaining UL subframes other than the UL subframe including the transition gap in the UL relay zone, the RS and the MS can maintain orthogonality with each other and thus can use the same time-frequency resource region.

Alternatively, in the UL subframe including the transition gap in the UL relay zone, the BS may not allocate the bandwidth request channel for the RS.

Alternatively, the BS can allocate a bandwidth request header dedicated for the RS in the UL subframe including the transition gap in the UL relay zone. Alternatively, the BS may allocate the bandwidth request header so that a bandwidth request is performed irrespective of the transition gap. Information on a period of the bandwidth request header and a repetition duration can be received by the RS by performing polling on an information element (IE) message. In general, the RS transmits a bandwidth request signal more frequently and has a more amount of resources required for the bandwidth request channel in comparison with the MS, and thus the BS can allocate the bandwidth request header periodically for the RS. Such a method may be effective when only one UL subframe exists in the UL relay zone.

Figure 17:
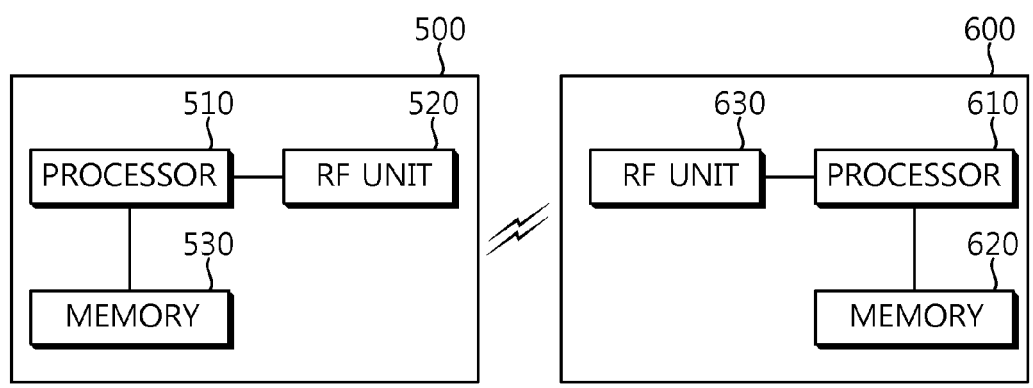
FIG. 17 is a block diagram showing structures of a relay station and a base station.

FIG. 17 is a block diagram showing structures of an RS and a BS.

A BS 500 includes a processor 510, a memory 530, and a radio frequency (RF) unit 520. The processor 510 performs scheduling to allocate a radio resource to an RS 600 and to receive a signal from the RS 600. The processor 510 can implement procedures, methods, and functions performed by the BS in the aforementioned embodiments. The memory 530 is coupled to the processor 510, and stores a variety of information for driving the processor 510. The RF unit 520 is coupled to the processor 510 and transmits and/or receives a radio signal.

The RS 600 includes a processor 610, a memory 620, and an RF unit 630. The processor 610 can implement procedures, methods, and functions performed by the RS in the aforementioned embodiments. For example, the processor 610 configures a UL relay zone for transmitting a signal by the RS to the BS in a frame and configures a resource unit including a plurality of symbols and a plurality of subcarriers to allocate the UL control signal in a subframe of the UL relay zone. The processor 610 generates and allocates the UL control signal transmitted by using the resource unit. If a transition gap required for switching of signal transmission and reception of the RS is included in the UL subframe of the UL relay zone, the UL control signal can be transmitted in the remaining symbols other than the plurality of symbols constituting the resource unit including the transition gap by the processor 610. The memory 620 is coupled to the processor 610, and stores a variety of information for driving the processor 610. The RF unit 630 is coupled to the processor 610 and transmits and/or receives a radio signal.

The processors 510 and 610 may include an application-specific integrated circuit (ASIC), a separate chipset, a logic circuit, and/or a data processing unit. The memories 530 and 620 may include a read-only memory (ROM), a random access memory (RAM), a flash memory, a memory card, a storage medium, and/or other equivalent storage devices. The RF units 520 and 630 may include a base-band circuit for processing a radio signal. When the embodiment of the present invention is implemented in software, the aforementioned methods can be implemented with a module (i.e., process, function, etc.) for performing the aforementioned functions. The module may be stored in the memories 530 and 620 and may be performed by the processors 510 and 610. The memories 530 and 620 may be located inside or outside the processors 510 and 610, and may be coupled to the processors 510 and 610 by using various well-known means.

According to the present invention, orthogonality between an uplink control signal transmitted by a relay station (RS) to a base station (BS) and an uplink control signal transmitted by a mobile station (MS) to the BS can be maintained to the maximum extent possible, and thus interference of the control signals can be reduced. Therefore, the RS can transmit the uplink control signals with high reliability.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for transmitting an acknowledgement (ACK)/not-acknowledgement (NACK) signal of relay station, the method comprising:
   determining a sequence corresponding to one of ACK signal and NACK signal;
   mapping the sequence onto three Hybrid automatic repeat request Mini-Tiles (HMTs), each HMT comprising two orthogonal frequency division multiple access (OFDMA) symbols contiguous in time domain by two subcarriers contiguous in frequency domain, wherein the three HMTs are continuous in the time domain and discontinuous in the frequency domain;
   determining whether a transition gap is inserted in at least one of a first OFDMA symbol and a last OFDMA symbol of the three HMTs;
   when the transition gap is inserted in the first OFDMA symbol of the three HMTs, one HMT, among the three HMTs, in the first OFDMA symbol and a second OFDMA symbol is punctured, and when the transition gap is inserted in the last OFDMA symbol of the three HMTs, one HMT, among the three HMTs, in the last two OFDMA symbols is punctured; and
   transmitting the mapped sequence to a base station,
   wherein the sequence is an orthogonal sequence having a four bit size and the four bits of the orthogonal sequence are mapped to each of the three HMTs.

2. The method of claim 1, wherein the three HMTs are the same radio resources in which a mobile station transmits an ACK or NACK signal without puncturing to the base station.

3. The method of claim 1, wherein the transition gap is a time required for switching of signal transmission and reception of the relay station.

4. A relay station comprising:
   a radio frequency (RF) unit for transmitting and receiving a radio signal; and
   a processor coupled to the RF unit,
   wherein the processor is configured for:
   determining a sequence corresponding to one of ACK signal and NACK signal;
   mapping the sequence onto three Hybrid automatic repeat request Mini-Tiles (HMTs), each HMT comprising two orthogonal frequency division multiple access (OFDMA) symbols contiguous in time domain by two subcarriers contiguous in frequency domain, wherein the three HMTs are continuous in the time domain and discontinuous in the frequency domain;

determining whether a transition gap is inserted in at least one of a first OFDMA symbol and a last OFDMA symbol of the three HMTs;

when the transition gap is inserted in the first OFDMA symbol of the three HMTs, one HMT, among the three HMTs in the first OFDMA symbol and a second OFDMA symbol is punctured, and when the transition gap is inserted in the last OFDMA symbol of the three HMTs, one HMT, among the three HMTs, in the last two OFDMA symbols is punctured; and transmitting the mapped sequence to a base station, wherein the sequence is an orthogonal sequence having a four bit size and the four bits of the orthogonal sequence are mapped to each of the three HMTs.

5. The relay station of claim 4, wherein the three HMTs are the same radio resources in which a mobile station transmits an ACK or NACK signal without puncturing to the base station.

6. The relay station of claim 4, wherein the transition gap is a time required for switching of signal transmission and reception of the relay station.

* * * * *